No. 824,496. PATENTED JUNE 26, 1906.
F. W. MARGETTS.
ATTACHMENT FOR MEAT CUTTING OR SLICING MACHINES.
APPLICATION FILED FEB. 5, 1906.

2 SHEETS—SHEET 1.

Witnesses

Inventor
Frederick W. Margetts
per
Attorney

No. 824,496. PATENTED JUNE 26, 1906.
F. W. MARGETTS.
ATTACHMENT FOR MEAT CUTTING OR SLICING MACHINES.
APPLICATION FILED FEB. 5, 1906.

2 SHEETS—SHEET 2.

Witnesses

Inventor
Frederick W. Margetts,
per Wm E. Boulter,
Attorney

UNITED STATES PATENT OFFICE.

FREDERICK WILLIAM MARGETTS, OF EAST DULWICH, ENGLAND.

ATTACHMENT FOR MEAT CUTTING OR SLICING MACHINES.

No. 824,496.          Specification of Letters Patent.          Patented June 26, 1906.

Application filed February 5, 1906. Serial No. 299,461.

*To all whom it may concern:*

Be it known that I, FREDERICK WILLIAM MARGETTS, mechanical engineer, a subject of the King of Great Britain, residing at 11 Bawdale road, East Dulwich, in the county of Surrey, England, have invented certain new and useful Improvements in Attachments for Meat Cutting or Slicing Machines, of which the following is a specification.

This invention relates to attachments for meat cutting or slicing machines of the kind wherein the meat is fed to a rotating cutter by a reciprocating table and adjusted transversely after each cut. In such machines as hitherto made the slices of meat as they are cut off fall down into a collecting-box or receiver close to the reciprocating table, from which they have to be picked up singly or by twos and threes by hand, by a fork, or otherwise.

The object of my invention is to provide an attachment for machines of the kind referred to whereby the slices of meat as they are cut off will be automatically picked up and stacked side by side, so that after the meat has been entirely cut up into slices the whole sliced piece can be picked up at once and removed, it being of approximately the same conformation as before slicing.

Figure 1:
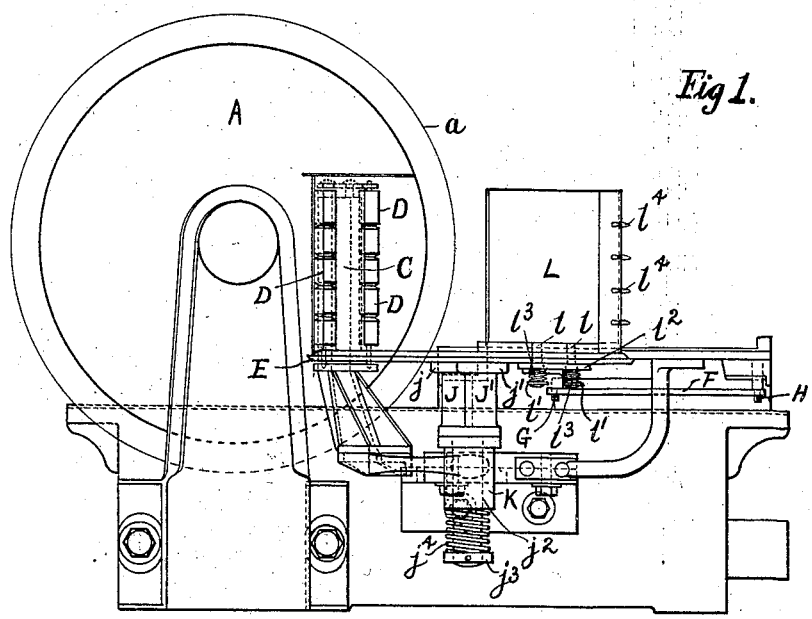
Figure 2:
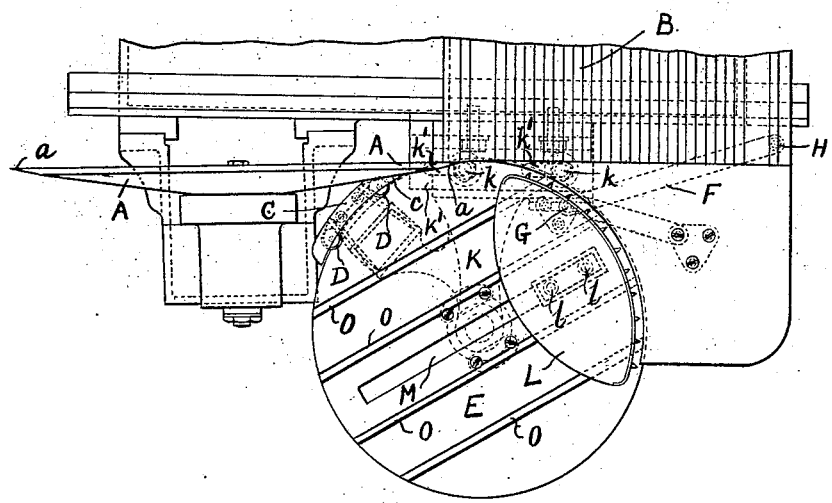

In the accompanying drawings, Figure 1 is a side elevation, and Fig. 2 is a plan showing part of a meat cutting or slicing machine of the character described with my invention applied thereto.

The same parts are lettered to correspond in both figures.

In the drawings, A represents the rotating cutter, and B the reciprocating table which carries the meat up to the cutter to be cut and back again and is adjusted transversely after each cut in the well-known manner. According to my invention I dispense with the usual collecting-box or receiver, and in place thereof I fix to the side of the machine adjacent to the cutter A an upright and curved guide-piece C, one edge $c$ of which rests against the cutter in rear of the beveled cutting edge $a$ thereof, so that as the meat is fed up to the cutter A the front edge of the slice will be received against the inner concave side of the fixed guide-piece C and will be compelled to travel thereover. To lessen the friction, the inner concave side of the guide-piece C may be fitted with any suitable number of vertically-arranged friction-rollers D, onto which the sliced-off meat is received. These rollers D may be arranged, as shown, in series one above the other and in two or more parallel rows.

Beneath the fixed guide-piece C, I mount a horizontally-rotating table E and connect it to the reciprocating table B of the machine by means of the link F and the pins G and H, so that said horizontally-rotating table E will make a partial forward and backward revolution as and when the reciprocating table B travels forward and backward. The horizontally-rotating table E is rigidly secured on its under side to flanges $j$ $j'$ on the upper ends of the arms J J' of a bifurcated bracket. To the lower end of said bifurcated bracket is rigidly secured or formed integrally therewith a pivot-pin $j^2$, screw-threaded at its lower end and provided with a nut $j^3$ and a coiled spring $j^4$. The pivot-pin $j^2$ passes through a cylindrical aperture in a bracket K, which latter is fixed by its flange K' to the front of the machine and is laterally adjustable thereon by means of the bolts $k$ and slotted apertures $k'$. By this means a center of motion is provided for the horizontally-rotating table E beneath its plane, thus allowing for the passage diametrally across its center of the slidably-mounted guide L to be afterward described.

The rotating table E is provided with a diametral slot M, in which is slidably mounted an upright and curved guide L. To the under side of the said guide L two studs or pins $l$ are riveted which pass through the slot M in the table E and are screw-threaded and provided with nuts $l'$. On these two studs or pins $l$ is placed a spring-plate $l^2$, having two apertures therein for the purpose, and the nuts $l'$ may bear direct against the under side of this spring-plate $l^2$ or coiled springs $l^3$ may be interposed between the spring-plate $l^2$ and the nuts $l'$. The curved guide L is fitted with suitable prongs $l^4$ to hold the first slice of meat, since were these prongs not provided for the first slice the latter might not adhere to the guide-piece C. The upper side of the rotating table E is provided with a suitable number of ridges O for the curved guide L to slide upon when traveling diametrally over the said rotating table and to form a bottom gripping-surface for the meat-slices.

As the reciprocating table B moves forward to carry the meat to the cutter A the rotating table E will make a partial forward revolution and its curved guide L will engage the cut-off front end of the slice and carry it round inside the fixed curved guide-piece C as and when the slice is removed from the piece by the rotating cutter A and will stack it against the prongs $l^4$. The same thing occurs with the next slice, which will be stacked against the preceding one, and so on until the whole piece is cut up into slices. The curved guide L on the rotating table E is moved along in the diametral slot M, in which it is mounted, the displacement being caused by the stacking of the successive slices against the said curved guide L. It will be found in practice that as each slice is cut the same will be forced against the preceding slice sufficiently hard to cause the same to closely adhere together enough to prevent the slices from dropping down during the oscillations of the table E, the said oscillations in practice not being of such rapidity as to exert more than a slight centrifugal action upon the slices, which action would be insufficient to cause the slices to be thrown down. The adhesion of the slices is increased by the fact that the surfaces of the slices are more or less moist.

Having fully described my invention, what I claim, and desire to secure by Letters Patent, is—

1. In meat cutting or slicing machines of the character described, the combination therewith of a curved guide-piece fixed near to the cutting edge of the rotating cutter, and a movable curved guide traveling in a circular path and operated by suitable mechanism connected to the reciprocating table which carries the meat to and from the rotating cutter, substantially as and for the purpose hereinbefore described.

2. An attachment for meat cutting or slicing machines of the character described, comprising an upright and curved guide-piece fixed with its leading edge in rear of the edge of the rotating cutter, and a movable curved guide mounted to slide in a diametral slot in a horizontally-rotating table connected to the reciprocating table of the machine so as to make a partial forward and backward revolution as when the reciprocating table travels forward and backward, substantially as described and for the purpose stated.

3. An attachment for meat cutting or slicing machines of the character described, comprising an upright and curved guide-piece fixed with its leading edge in rear of the edge of the rotating cutter, a horizontally-rotating table having a diametral slot therein, and mounted on a center of motion beneath its plane, means for connecting said horizontally-rotating table to the reciprocating table of the machine, so that it will make a partial forward and backward revolution as when the reciprocating table travels forward and backward, and a movable upright and curved guide slidably mounted in said diametral slot in the horizontally-rotating table, substantially as and for the purpose hereinbefore described.

In testimony whereof I have hereunto set my hand, in presence of two subscribing witnesses, this 26th day of January, 1906.

FREDERICK WILLIAM MARGETTS.

Witnesses:
H. D. JAMESON,
F. L. RAND.